United States Patent [19]
Gilmour

[11] 3,950,723
[45] Apr. 13, 1976

[54] SONAR APPARATUS
[75] Inventor: George A. Gilmour, Severna Park, Md.
[73] Assignee: Westinghouse Electric Corporation, Pittsburgh, Pa.
[22] Filed: Feb. 21, 1974
[21] Appl. No.: 444,590

[52] U.S. Cl. ................................................ 340/3 R
[51] Int. Cl.² .......................................... G01S 9/68
[58] Field of Search .......... 340/1 R, 3 R, 6 R, 8 L; 343/100 SA

[56] References Cited
UNITED STATES PATENTS

| | | | |
|---|---|---|---|
| 3,086,195 | 4/1963 | Halliday | 340/8 L |
| 3,090,030 | 5/1963 | Schuck | 340/6 R |
| 3,585,579 | 6/1971 | Dorr | 340/10 |
| 3,742,436 | 6/1973 | Jones | 340/3 R |

*Primary Examiner*—Richard A. Farley
*Attorney, Agent, or Firm*—D. Schron

[57] ABSTRACT

A high resolution side-looking sonar system wherein the focus is electronically varied with range such that any and all returns are in focus. Focusing is accomplished by time varying phase cancellation, the apparatus additionally forming multiple receiver beams for increasing search rate.

12 Claims, 24 Drawing Figures

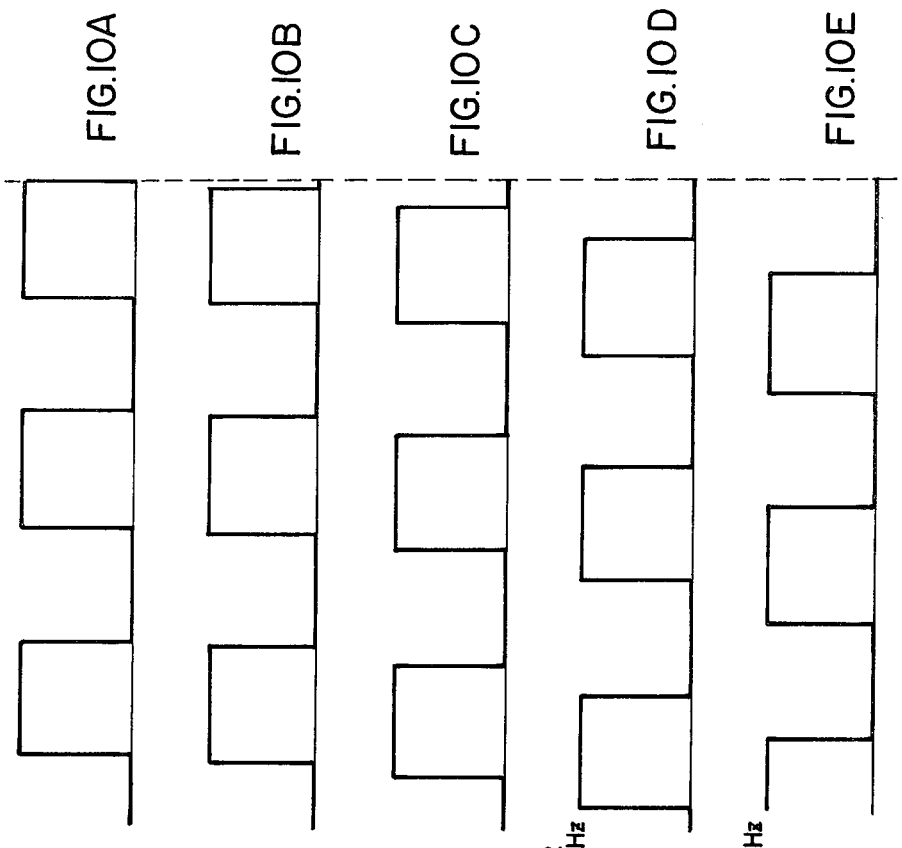
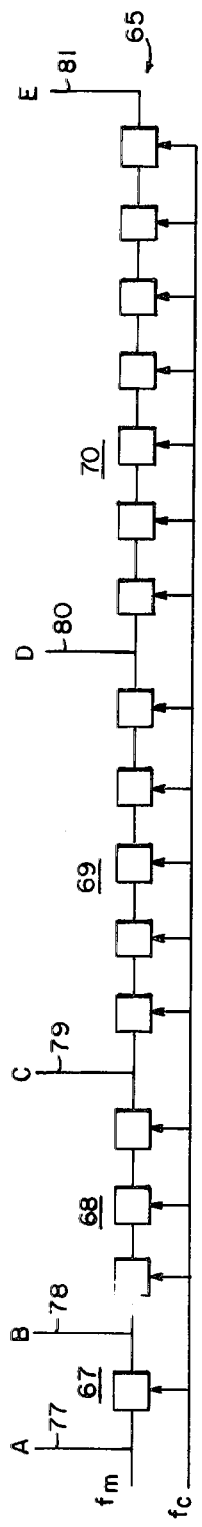
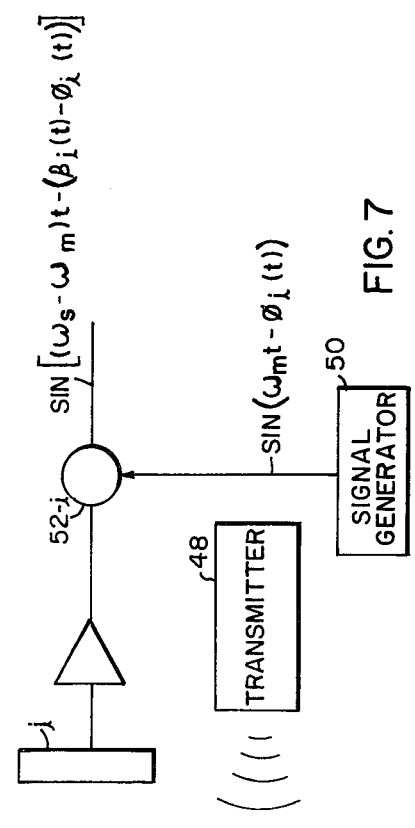
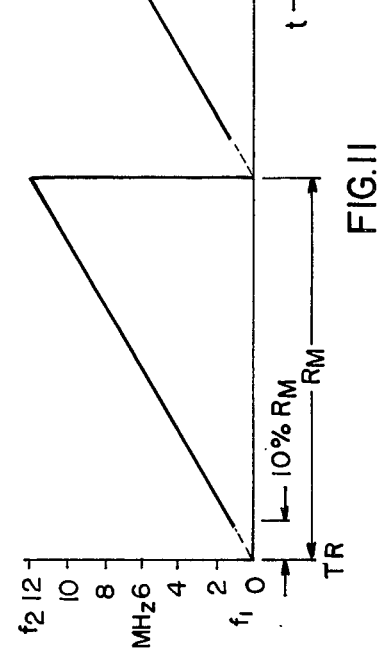

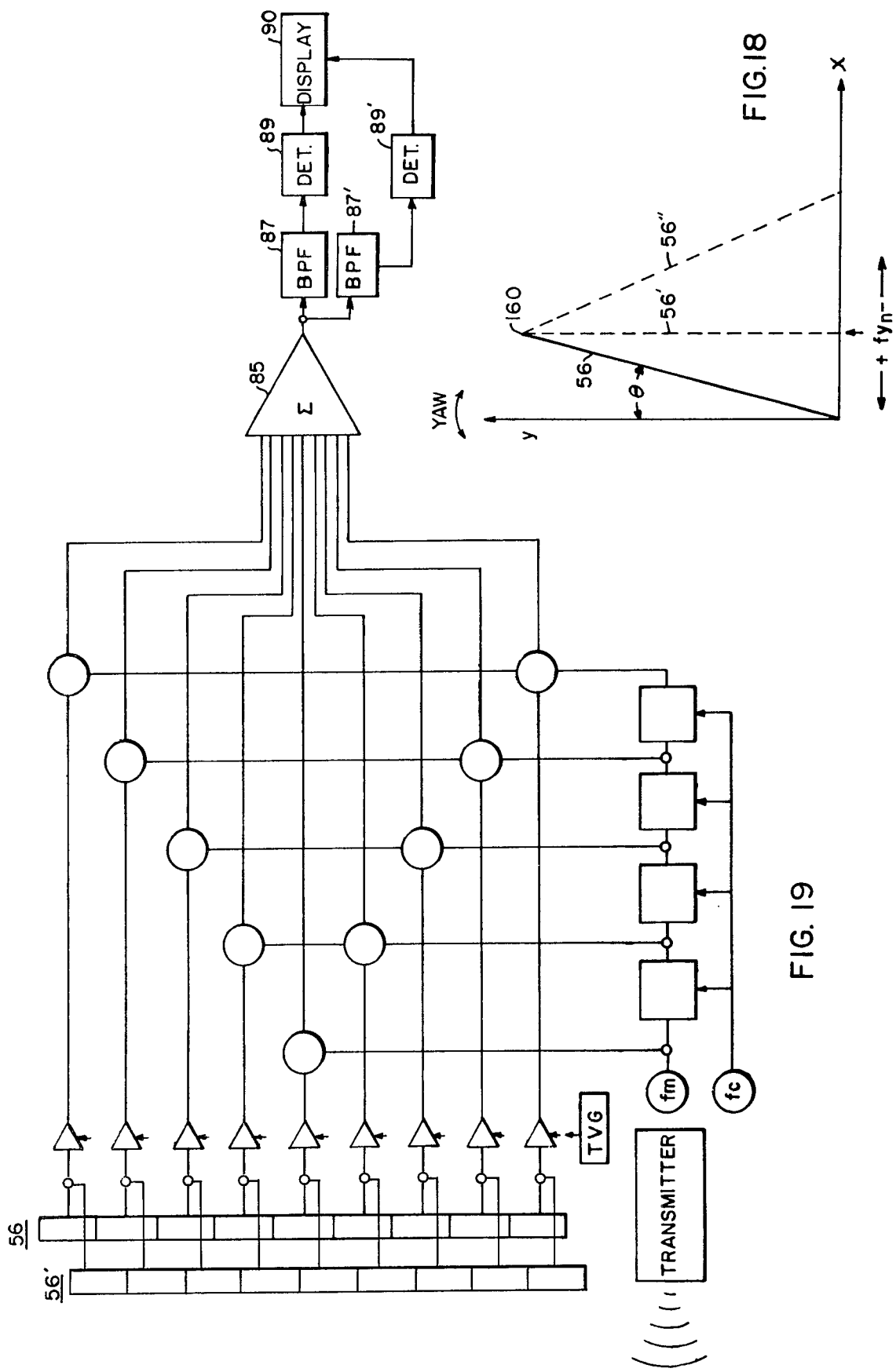

SONAR APPARATUS

BACKGROUND OF THE INVENTION

1. Field of the Invention

The invention in general relates to sonar systems, and more particularly to a side-looking sonar system with all range focusing and increased search rates.

2. Description of the Prior Art

In side-looking sonar systems, a transducer on a carrier vehicle periodically projects pulses of acoustic energy toward a target area such as the sea bottom. The transmitted energy has a beam pattern which is of extremely narrow width in the direction of carrier travel so that a projected pulse of acoustic energy initially impinges upon the sea bottom and sweeps out a relatively narrow elongated area known as the insonified area.

Acoustic energy reflected back from the insonified area, and targets on it, is received by a receiver transducer. The receiver beam associated with the receiver transducer is similar to the transmitted beam such that the receiver detects reflected acoustic energy from the relatively narrow insonified area. The received acoustic energy is processed and displayed on a suitable display apparatus. With each pulse transmission and subsequent reception a scan line is produced on the display to build up a picture of the sea bottom in a manner similar to the scanning of a conventional cathode ray beam in a television picture tube.

With the insonified area being swept out to the side, or sides of the carrier vehicle, the resolution in the direction of vehicle travel is limited by the length of the receiver transducer. For increased resolutions there has been developed a side-looking sonar transducer which is of a curved configuration wherein the transducer segments making up the transducer lie along the arc of a circle whose radius is the design altitude and acoustic energy is focused along a line of focus on the sea bottom. These focused transducers however must be used at a precise altitude above the sea bottom since excursions above or below this design altitude tend to defocus the operation and consequently degrade the display. Proposals to obviate this design limitation have included the use of electronic focusing which involves a plurality of fixed delays in series with the transducer segments and wherein these delays are switched into the circuit after predetermined time durations so that focusing occurs in steps. Although this method is a step toward freeing the transducer from a critical altitude, the switching in of the delays results in a display which objectionably changes its gray scale periodically.

The maximum Search rate S of a side-look sonar which achieves a resolution r (generally the width of the insonified strip) is given by $S = Nrc$. Where N is the number of beams per side, and c is the speed of sound in the water. If the search rate is to be improved for a given resolution, several beams must be formed in the time it takes for a single pulse to travel out to the maximum range and return. The multi-beam capability also allows for the maintaining of a certain search rate with improved resolution. Multiple beam side looking sonar systems have been developed such as illustrated in U.S. Pat. No. 3,742,436, however such systems are constrained to a particular design altitude above the target area, plus or minus some depth of field.

SUMMARY OF THE INVENTION

The present invention provides for a side-looking sonar system with electronic beam forming for all range focusing in the near field. The focus is varied with range such that any and all returns are in focus making possible high resolution imaging of moored objects and better performance over rough bottom terrain.

The apparatus includes a receiver transducer comprised of a plurality of transducer segments each operable to provide a distinct output signal in response to reception of acoustic energy from a previously insonified target area of interest. Means are provided for shifting the phase of the signals provided by the transducer segments, to cancel any relative phase differences between them with the shifting of phase being varied with time. The effect of this operation is in essence to simulate a transducer with a sharp curvature to focus close in early after a transmitted pulse then to decrease the curvature with time as the return comes in from longer ranges.

By providing different phase shifts at different points in time to the output signals provided by the transducer segments multiple receiver beams can be formed. By varying the phasing in accordance with the yaw rate of a carrier vehicle, the beam or beams formed can be effectively steered to compensate for the yaw (rotation of the carrier vehicle about a vertical axis).

In a preferred embodiment the phase shifting technique with time is accomplished with the provision of a digital shift register providing output signals along its length to a plurality of mixers, which also receive the transducer segment outputs. The digital shift register is controlled by a clock frequency which varies with time and the output of the mixers are summed together to provide an output signal for further processing and display.

BRIEF DESCRIPTION OF THE DRAWINGS

FIG. 7 is a block diagram of signal processing apparatus explaining the principle of operation of the present invention;

FIG. 9 illustrates a portion of FIG. 8 in more detail;

FIG. 10A to 10E are waveforms at various points of the circuit of FIG. 9;

FIG. 11 illustrates a waveform for an oscillator of FIG. 8;

FIG. 18 is a diagram explaining the yaw compensation; and

FIG. 19 is another embodiment illustrating port and starboard coverage.

DESCRIPTION OF THE PREFERRED EMBODIMENT

Figure 1:
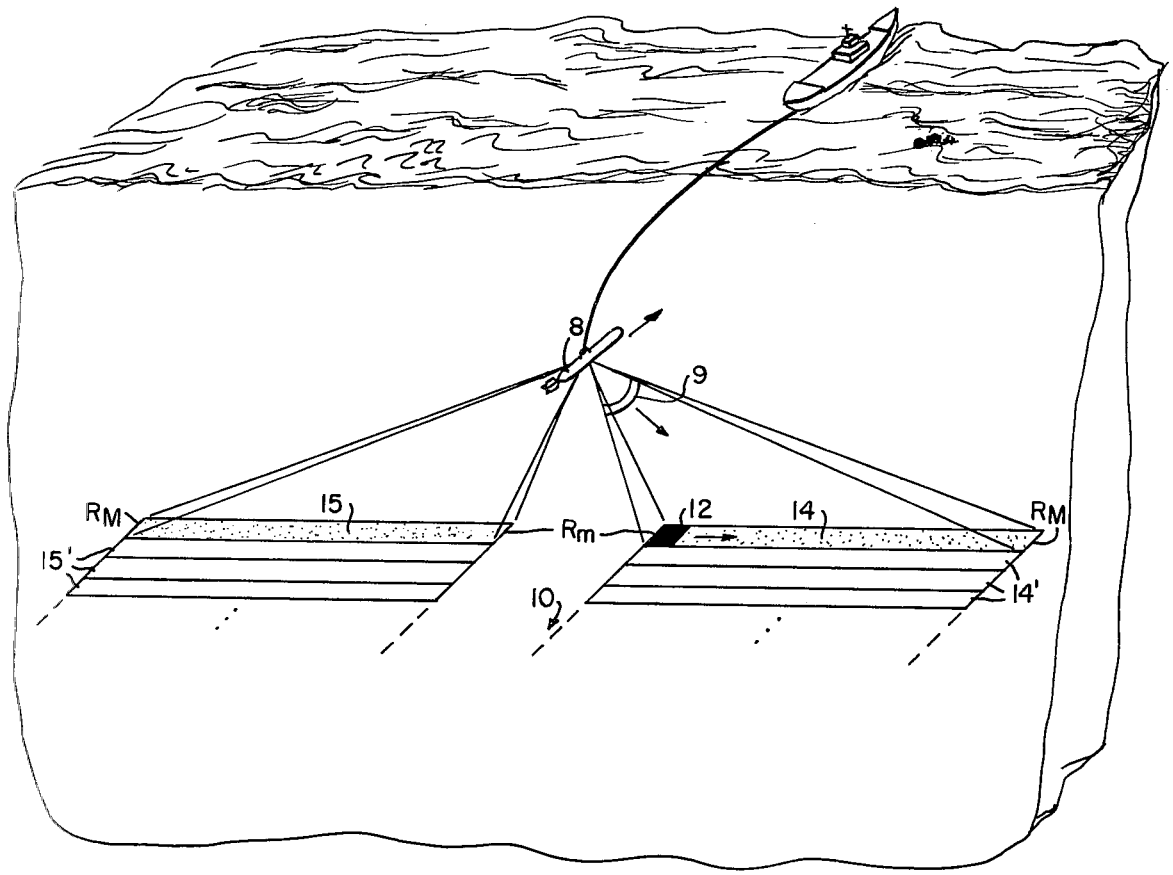
FIG. 1 illustrates a side-looking sonar system in operation over a target area.

FIG. 1 serves to basically illustrate the principles of a side-looking sonar system. Side-looking sonar transducers mounted on carrier vehicle 8 transmit acoustic energy pulses one of which, 9, is illustrated in a certain beam pattern such that the sound energy impinges on the bottom 10, as indicated by the darkened area 12 and scans or sweeps out, elongated narrow insonified strips 14 and 15 produced by starboard and port transducers respectively. Depending upon the carrier vehicle speed and system design, the same transducers or similar transducers having certain receiver beams associated therewith will receive reflected acoustic energy containing information relative to the bottom or targets on the bottom, and these received signals are processed and displayed.

As the vehicle 8 proceeds along a course line in the direction of the arrow, multiple sequential acoustic transmissions take place such that multiple adjacent areas on the bottom are insonified. Areas 14 and 15 represent the strip presently being insonified whereas the strips 14' and 15' represent previously insonified strips from which information has been received. That is, each return signal contains information and collectively the return signals are indicative of a sound picture of the target area.

In general, returns from directly below the vehicle will not contain useful information and accordingly the apparatus is arranged such that the display will portray target information from some minimum range $R_m$ out to some maximum range $R_M$, dependent upon such factors as transmitter power, frequency, attenuation, and pulse repetition frequency of the apparatus.

Figure 2:
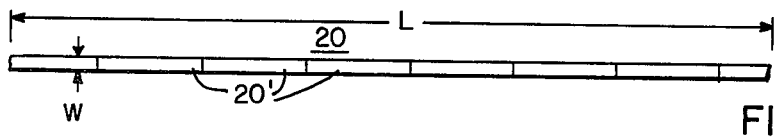
FIGS. 2 and 3 illustrate two different arrangements of transducers made up of a plurality of transducer sections or segments.

FIG. 2 illustrates a typical transmitter transducer, or receiver transducer, used for side-looking sonar operations. If $\lambda$ is the wavelength in water of the operating frequency, the length L of transducer 20 may typically be hundreds of $\lambda$ and the width W in order of ¾ $\lambda$. The transducer may be fabricated of a transducer material such as lead zirconate titanate (PZT) and is generally made up of a plurality of transducer segments 20'.

Figure 3:
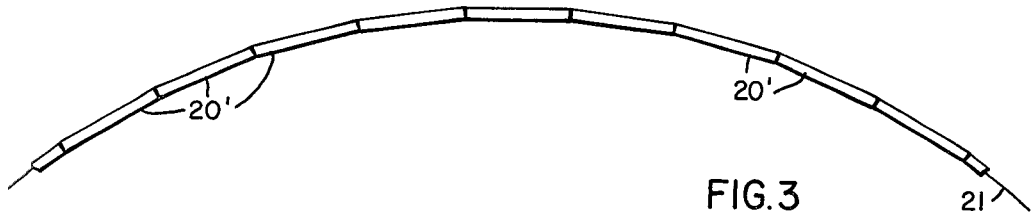

In FIG. 3 for beam forming in the near field the transducer segments 20' are arranged on the arc 21 of a circle whose radius is the design altitude to provide a transducer which is focused along an extremely narrow insonified area on the bottom, the width of the insonified area in the direction of travel in that case being less than the length of the transducer.

Figure 4:
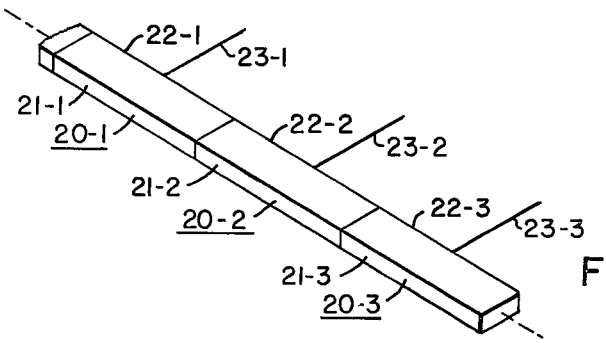
FIG. 4 illustrates in somewhat more detail a few transducer segments.

FIG. 4 illustrates three transducer segments 20-1 20-2, and 20-3 constituting a portion of a linear array transducer. Each of the transducer elements or segments includes an active surface 21-1, 21-2 and 21-3 for transmission and/or reception of acoustic energy. The active surfaces have suitable electrode means which may be all at the same reference potential. Other electrode means are positioned on respective opposite surfaces 22-1 to 22-3 which are connected to respective output leads 23-1 to 23-3, which in the receive mode provide output signals in response to impingement of acoustic energy on the active surfaces.

ALL RANGE FOCUSING

Figure 5A:
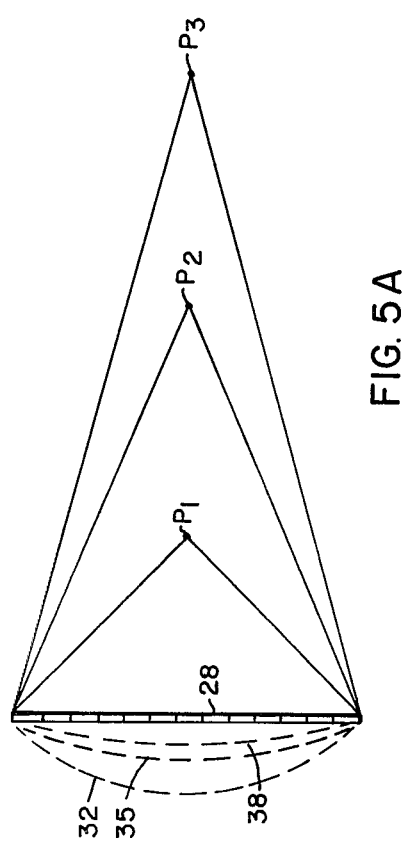
FIGS. 5A and 5B are plan and elevational views respectively of a transducer illustrating the focusing thereof.
Figure 5B:
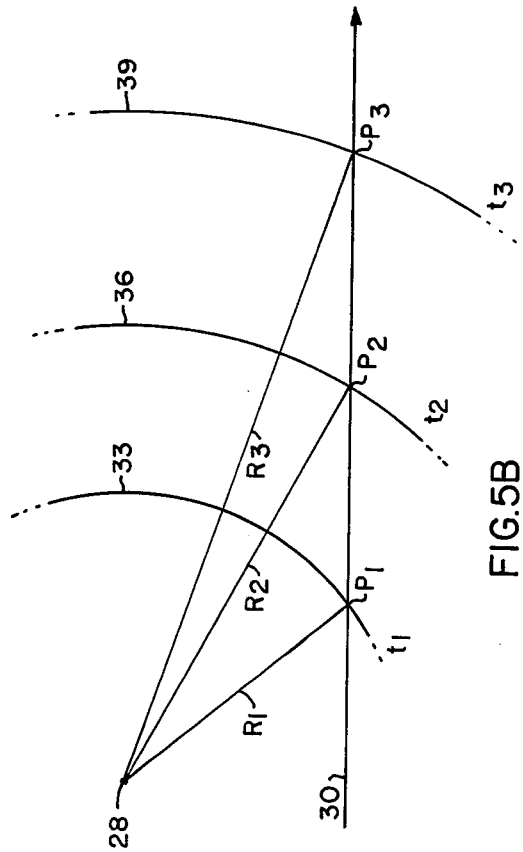

FIGS. 5A and 5B serve to illustrate the principle of electronically formed arcs that can be formed by delaying the signal from receive transducer segments which are in a straight line. FIG. 5A is a plan view of the transducer 28 and FIG. 5B is an elevational view which also shows a target area such as the sea bottom 30.

Let it be assumed that at some time $t_1$ the output signals from the segments from transducer 28 are delayed in such a manner that the transducer 28 electronically assumes the shape of arc 32. At such time, the transducer will be focused at the range $R_1$ and will be focused not only at point $P_1$ on the bottom 30, but will be focused at all points along a vertical circle of radus $R_1$, a portion of which, 33 is illustrated. At time $t_2$ arc 35 is formed such that the transducer is focused at range $R_2$ encompassing not only point $P_2$ but all points along the vertical circle 36. The process continues and arc 38 illustrates the situation at time $t_3$ where the transducer is in focus at range $R_3$ at point $P_3$ and at all points along the circle 39.

The electronically formed arc should start out with a sharp curvature to focus close-in early after transmit, then decreases the curvature with time as the return progresses out to longer ranges. The arc changes according to the relationship $$R = (ct)/2 \qquad (1)$$

where R is the range (and radius of curvature of the arc) $c$ is the speed of sound in the water, and $t$ the time after transmit. The array is automatically in focus for any signal that can come in from range R independent of the depth of the bottom relative to the carrier vehicle.

Figure 6:
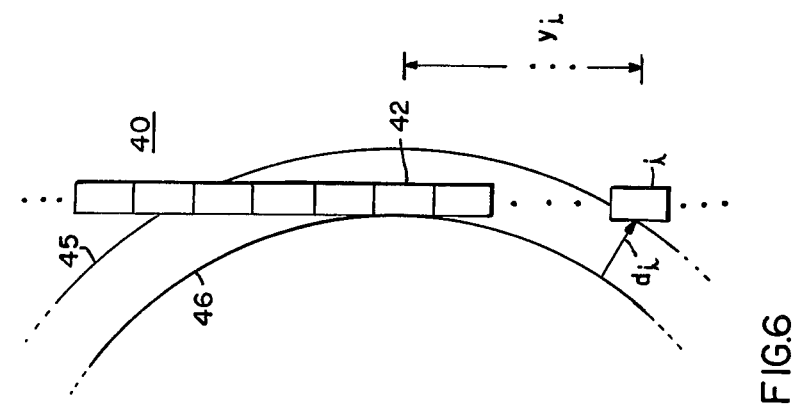
FIG. 6 serves to illustrate the relationship of a wave front to a segmented transducer.

In the preferred embodiment of the present invention the output signals from the transducer segments are processed in order to electronically form the arc of radius R which continually increases as a function of time after a transmission. The signal processing means which accomplishes the focusing of the transducer effectively focuses it at a predetermined initial range and continuously electronically varies the focus after each such transmission. Focusing is necessary for beam forming in the near field where the near field is defined as extending from the transducer roughly out to a range of $L^2/\lambda$, L being the transducer length and $\lambda$ the operating wavelength in water. In order to gain a better understanding of the operation and the circuitry to be described, reference should be made to FIG. 6 serving to illustrate some basic principles. In FIG. 6 there is illustrated a transducer 40 with the center segment thereof being designated by the numeral 42. Segment $i$ located at a distance $y_i$ from the center segment 42 represents any segment of the transducer. Two wavefronts 45 and 46 originating from point source P are illustrated. Arbitrarily let the phase be correct at the center segment 42. The acoustic signal as represented by wavefront 45 arriving at transducer segment $i$ is from an earlier time than wavefront 46 simultaneously arriving at the center transducer segment 42. The phase difference between the output signal of segment $i$ and segment 42 is $\beta_i$ (in radians) and is dependent upon distance $d_i$ and the wavelength of the acoustic signal in water according to the relationship:

$$\beta_i = (2\pi d_i)/\lambda \tag{2}$$

Each isonifying acoustic pulse transmission contains a number of cycles of operating frequency. The pulse is reflected back to the receiver transducer from any objects located in the path of the pulse and each transducer segment will provide an output signal the magnitude and phase of which is dependent upon a number of factors such as object distance and angular position relative to a particular segment, and strength of the reflected signal. Neglecting amplitude designation the sonar signal from the $i^{th}$ transducer segment may be represented by $$\sin[\omega_s t - \beta_i(t)] \tag{3}$$

where $\omega_s = 2\pi f_s, f_s$ being the sonar frequency. $\beta_i$ in equation (3) is shown to be a function of time that is, $\beta_i$ varies with time since the curvature of the wavefront decreases with time after the transmit pulse.

In the present invention, means are provided for processing the output signals from the transducer segments and includes circuitry for modifying the phase of selected ones of the output signals as a function of time and for thereafter detecting the informational content of, and displaying the processed signals. As basically illustrated in FIG. 7, sometime after each acoustic transmission by transmitter 48, a signal generating means 50 generates a mixing signal for the $i^{th}$ transducer segment in the form of $$\sin[\omega_m t - \phi_i(t)] \tag{4}$$

where $\omega_m$ is equal to $2\pi f_m, f_m$ being a mixing frequency. The output of the signal generator 50 is combined with the output of the $i^{th}$ transducer segment in a signal combining circuit in the form of mixer 52$i$ an output of which is in the form of:

$$\sin[(\omega_2 - \omega_m)t - (\beta_i(t) - \phi_i(t))] \tag{5}$$

Figures 8, 14:
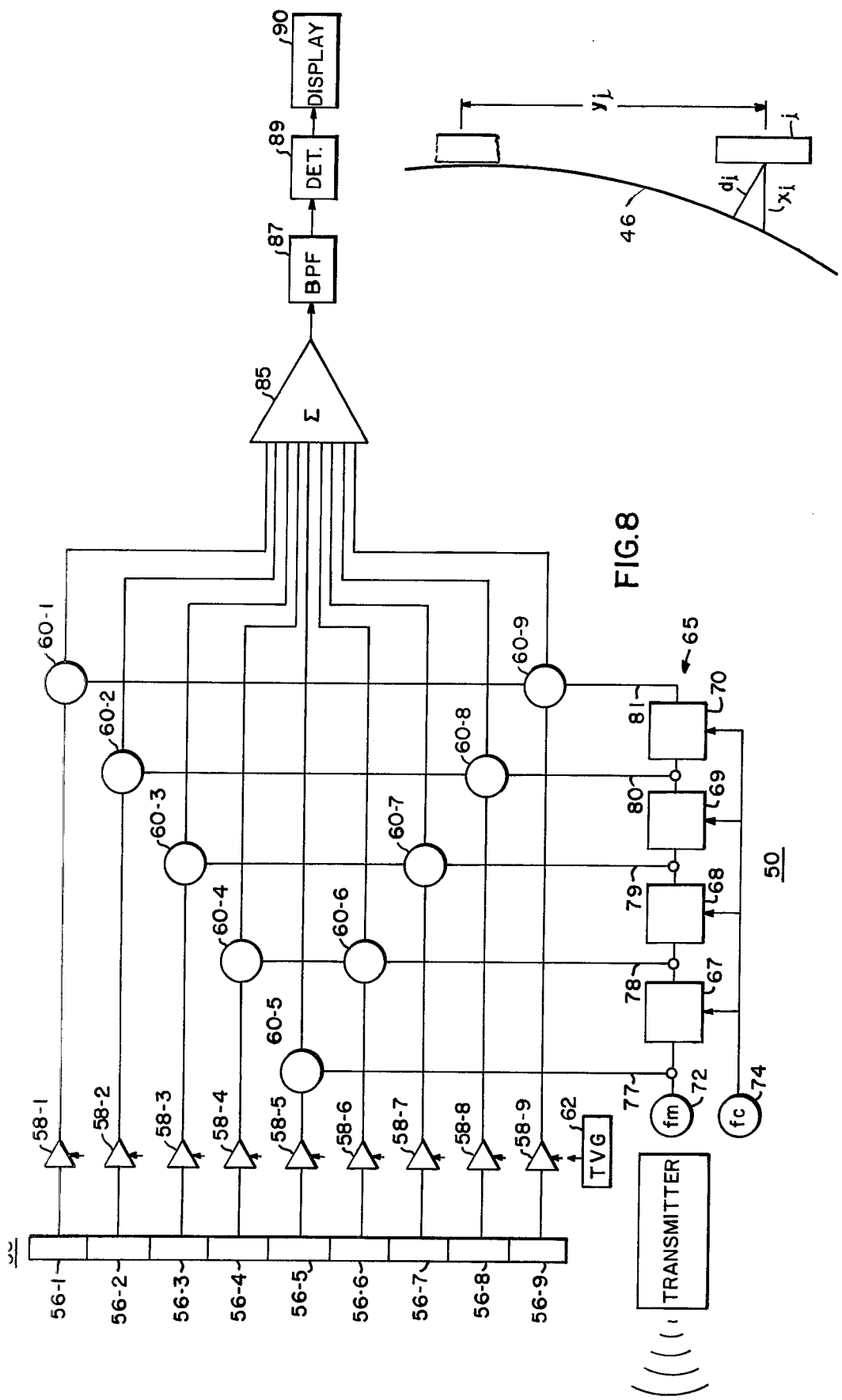
FIG. 8 illustrates a preferred embodiment of the present invention for forming a single beam.
FIG. 14 serves to define certain terms utilized herein and illustrates a wave front in relation to a transducer segment.

Basically, the signal generator 50 accomplishes two things. Bearing in mind that each transducer segment is providing an output signal of a certain phase, the signal generator at any point in time provides signals to cancel the phase difference relative to a reference segment output. In other words, and with reference to equation 5, at any point in time, $\phi_i$, the phase of the signal generator output to the $i^{th}$ transducer segment is made substantially equal to $\beta_i$, the phase of the transducer segment output. Since the transducer curvature is to vary with time in order to accomplish all range focusing, $\phi_i$ also varies with time such that for each transducer segment output, $\phi_i(t)$ is made to track each $\beta_i(t)$ thereby canceling phase differences for all of the transducer segments at any point in time where acoustic returns are coming in from the minimum out to the maximum range. One such arrangement for accomplishing this is illustrated in FIG. 8 to which reference is now made.

A transducer 56 is shown, for the purpose of illustration, to be divided into nine segments, 56-1 to 56-9. A plurality of preamplifiers 58-1 to 58-9 is connected to respective transducer segments and provide the sonar signal to respective signal combining circuits, mixers 60-1, to 60-9. For side-looking sonar operation it is desired that the typical no-target bottom return pattern be somewhat uniform in appearance. Accordingly, to compensate for decreasing acoustic signal strength due to spreading, absorption, and angle of incidence with the bottom, a typical side-looking sonar system will generally include a time varying gain circuit which varies the amplifier gain from a low value to a high value in accordance with a prescribed curve, during the time that a return signal is present. Accordingly, a time varying gain circuit 62 is included and provides its output signal to all of the preamplifiers.

The signal generator 50 which provides the signals required for phase correction can be generated by circuitry which includes a digital shift register 65 employing a plurality of tapped stages 67 to 70. An oscillator 72 is provided to generate the mixing signal $\omega_m$ discussed with respect to FIG. 7. The mixing signal is transmitted down the shift register 65 by being stepped through the stages thereof at a rate determined by a control frequency generator 74 which simultaneously clocks the stages 67 to 70.

The desired phase shifts for the transducer segment outputs are selected from taps 77 to 81, with the output of oscillator 72 being fed directly to mixer 60-5 by way of tap 77. A signal shifted in phase from the one appearing at tap 77 is applied to both mixers 60-4 and 60-6 by way of tap 78, and further phase shifted signals are provided by taps 79, 80 and 81 to respective mixers 60-3 and 60-7, 60-2 and 60-8, and 60-1 and 60-9.

Although the required phase shifts can be generated by varying the frequency of oscillator 72, in the present example the phase shift generation is accomplished by varying the frequency of control generator 74 with respect to time.

In operation therefore, each mixer provides an output signal in which the phase difference relative to the center segment 56-5 has been eliminated. These signals are further processed by being collectively summed in adder 85 and provided to a band pass filter 87 for eliminating unwanted side bands and harmonics such that its output signal to detector 89 is $f_s-f_m$ with $f_s$ being the sonar frequency and $f_m$ being the mixer frequency. The information content of the signal is then provided by the detector 89 as a display signal to a recording or display device 90 in a well known manner.

The digital shift register 65 is illustrated in somewhat more detail in FIG. 9. The four stages, 67, 68, 69, and 70 are illustrated with the stage 67 comprising one flip-flop providing one unit of delay to signal $f_m$. Stage 68 is comprised of three flip-flops providing three units of delay, stage 69 is comprised of five flip-flops providing five units of delay to the signal appearing at tap 79 and stage 70 is comprised of seven flip-flops providing seven units of delay to the signal appearing at the tap 80. Collectively, therefore, relative to the signal $f_m$, the signal at tap 78 is delayed by one unit, at tap 79 by four units at tap 80 by nine units, and at tap 81, by 16 units. Considering stage 67 as stage one, 68 as stage two, 69 as stage three and 70 as stage four, the delay is equal to the square of the stage number. Each flip-flop is of the type which will transfer an input signal to its output each time it is stepped by the clock.

The waveforms of FIGS. 10A to 10E illustrate the relative output signals on lines 77 to 81 respectively. Waveform 10A is the output of the oscillator 72 and may be a square wave having a frequency $f_m$ of 75 kilohertz, for example.

The flip-flops are clocked by the control frequency $f_c$ which in the present example varies with time such as illustrated in FIG. 11. Each time an acoustic pulse is transmitted at time TR, the control frequency generator 74 commences to provide a clocking pulse the frequency of which linearly varies with time until such time that returns from maximum range have come in, after which the process is repeated. Since no information is displayed for the first 10 percent of range, the generator 74 actually provides an output signal to the flip-flops beginning with a frequency $f_1$ and terminating at a maximum frequency $f_2$ at maximum range $R_M$. By way of example $f_1$ may be 1.2 megahertz and $f_2$ 10 times that amount or 12 megahertz.

FIG. 10B represents the $f_m$ signal after one unit of delay by stage 67 and at one particular control frequency $f_c$ in its ramp, for example at 2.4 megahertz. After three units of delay the $f_m$ waveform is phase shifted relative to waveform A by that waveform illustrated in FIG. 10C, after five units of delay, after stage 69, the waveform is phase shifted as in FIG. 10D and after seven more units of delay provided by stage 70, the waveform is as illustrated in FIG. 10E.

Since the clocking frequency $f_c$, in the megahertz range, is much greater than the frequency of the mixing signal $f_m$, in the kilohertz range, the waveforms illustrated in 10A to 10E would actually be turning on and off at the control frequency rate, however for convenience just the envelope of the mixing signal $f_m$ is illustrated. It is to be noted that waveforms 10A to 10E represent a static condition in what is actually a dynamic operation. Waveforms 10A to 10E represent in essence a snapshot of the relative waveforms at a single point in the $f_c$ ramp whereas a motion picture would be required to show the actual operation from $f_1$ to $f_2$, and during which the waveforms would move relative to reference line R by amounts proportional to $\phi_i(t)$ of equation 5.

After each transmitted sonar pulse therefore and while the returns are coming in from the insonified area, the clocking frequency varies linearly with the time and the waveforms illustrated in FIGS. 10B, 10C, 10D and 10E will be varying in phase relative to waveform A for time varied phase cancellation of the sonar signal's $\beta_i(t)$. The phase differences between the waveforms are illustrated with respect to the reference line R at the right of the waveforms since in actuality waveform E represents the output of the oscillator 72 at a point earlier in time than all waveforms above it, as do the remaining waveforms.

Very shortly after the acoustic transmission and when returns are to be processed, the clock frequency is relatively low thereby simulating maximum curvature of the transducer 56 (FIG. 8) in order to focus on a relatively close area of interest. As the clock frequency increases, the transducer arc becomes less curved so that the array is automatically in focus for any signal that could come in from the insonified area out to the maximum range. Maximum delay is provided at tap 81 so that mixers 60-1 and 60-9 are provided with the greatest phase shift and which phase shift progressively decreases with preceding taps.

Figure 12:
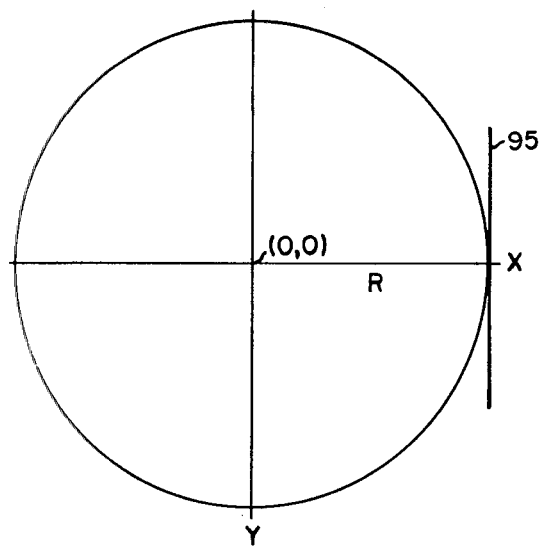
FIG. 12 illustrates a transducer in a coordinate system.
Figure 13:
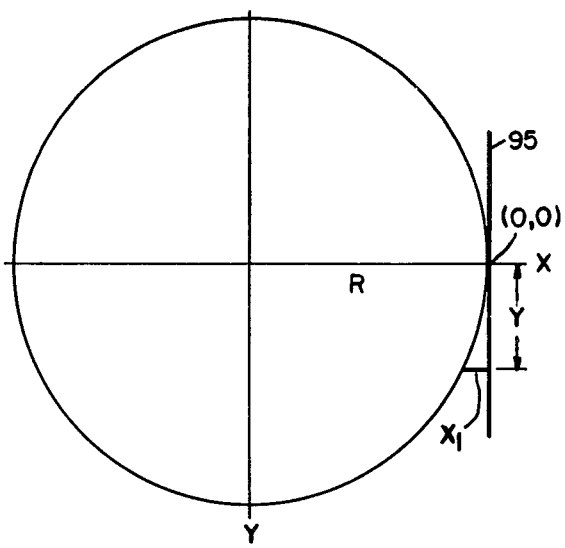
FIG. 13 is the same as FIG. 12 with the coodinates shifted.

The amount by which the signal $f_m$ should be delayed in its travel down the shift register 65 and accordingly the amount of phase shift generated for each transducer segment, is a function of that particular segment's distance from the reference segment. This principle will be explained with reference to FIGS. 12 and 13 illustrating a transducer in an X-Y coordinate system, and FIG. 14 illustrating a wavefront and transducer segment as in FIG. 6. Ideally, the segmented straight line transducer 95 would have all of its segments on a circle of radius R where R is range. The circle is shown tangent to the transducer 95 in an X-Y coordinate system with its center at point (0,0). The equation for the circle is given by the formula:

$$R^2 = X^2 + Y^2 \quad (6)$$

It is convenient for purposes of discussion to transform the coordinates such that the center of the transducer 95 remains fixed in position and the range moves, so that FIG. 13 illustrates transducer 95 along the Y axis and centered at point (0,0). If we let $$X_1 = X + R \quad (7)$$

this may be substituted into equation (6) to yield:

$$0 = X_1^2 - 2X_1 R + Y^2 \quad (8)$$

Equation 8 can be solved for $X_1$ giving:

$$X_1 = R - \sqrt{R^2 - Y^2} \quad (9)$$

This can be expanded into a series and it can be shown that to a good approximation:

$$X_1 \approx Y^2/2R \quad (10)$$

Since $R = (ct)/2$ $$X_1 = Y^2/(ct) \quad (11)$$

Equation 11 illustrates that the delay equivalent $X_1$, changes inversely with time and that the magnitude of the delay $X_1$ is proportional to the square of the distance Y from the element in question to where the arc touches the transducer, point (0,0).

FIG. 14 illustrates the $i^{th}$ transducer segment, as in FIG. 6, at a distance of $Y_i$ from the center transducer segment. The wavefront 46 is at a distance of $d_i$ from the $i^{th}$ transducer segment along a radial line and with the relatively small angles involved, $d_i$ is approximately equal to $X_i$ which is the distance from the $i^{th}$ transducer segment out to the wavefront 46 along the X coordinate axis. The $X_i$ in FIG. 14, which is substantially equal to $d_i$, is the $X_1$ of equation 11. Since $X_i$ is substantially equal to $d_i$ it may be substituted for $d_i$ into equation (2) to yield, as a function of time:

$$\beta_i(t) = \frac{2\pi Y_i^2}{\gamma c t} \quad (12)$$

MULTIPLE BEAM FORMING

Figure 15:
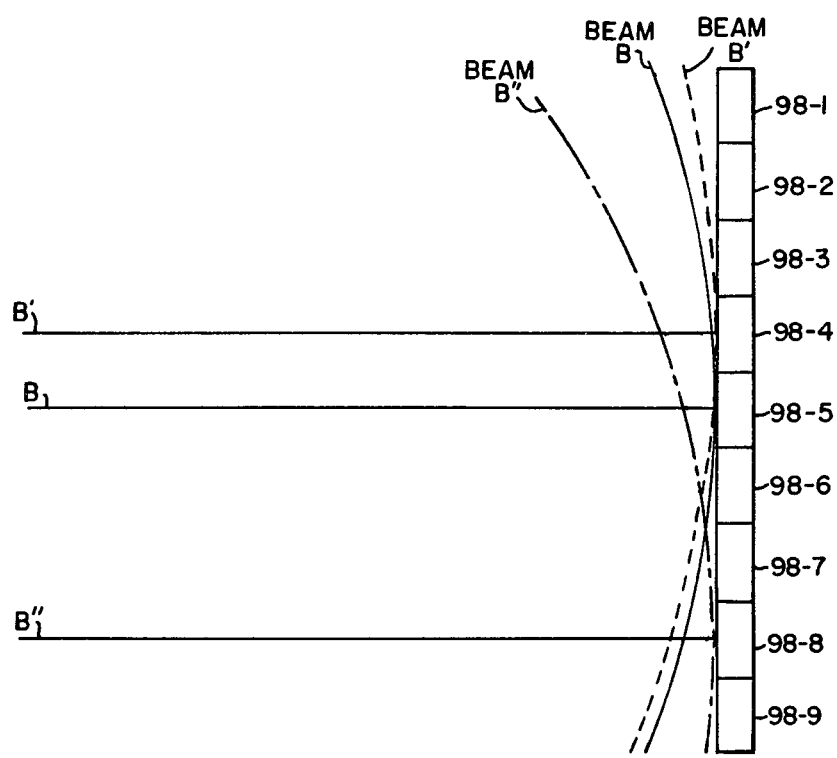
FIG. 15 illustrates the principle of forming multiple receiving beams.

The advance rate of the carrier vehicle is constrained to be equal to one insonified area width per acoustic transmission, for a single beam side-looking sonar. This is typically of the order of magnitude of 2 to 3 knots for a high resolution side-looking sonar. The carrier vehicle speed can be increased by a factor of N if N receiver beams are formed per side. The technique discussed with respect to FIG. 8 can be utilized to form additional beams parallel to the beam centered on the transducer. For example, FIG. 15 illustrates a transducer 98 comprised of transducer segments 98-1 to 98-9. The solid line arc centered on segment 98-5 is for the formation of receiver beam B and is formed as previously described. Other receiver beams can be centered on other segments and the dotted line arc centered on segment 98-4 is the arc associated with the receiver beam B' shown parallel to receiver beam B. For convenience the beams are represented by straight lines defining the beam direction. The dot-dash arc forms beam B'' and is centered on transducer segment 98-8. Many of the phase shifts required to form one beam are identical to those required for forming other beams, however they are just applied to the outputs of different transducer segments. The phase shift required to form a specific beam can be found from equation 12 where $Y_i$ is taken to be the distance of the particular transducer segment to the reference segment for that particular beam.

Figure 16:
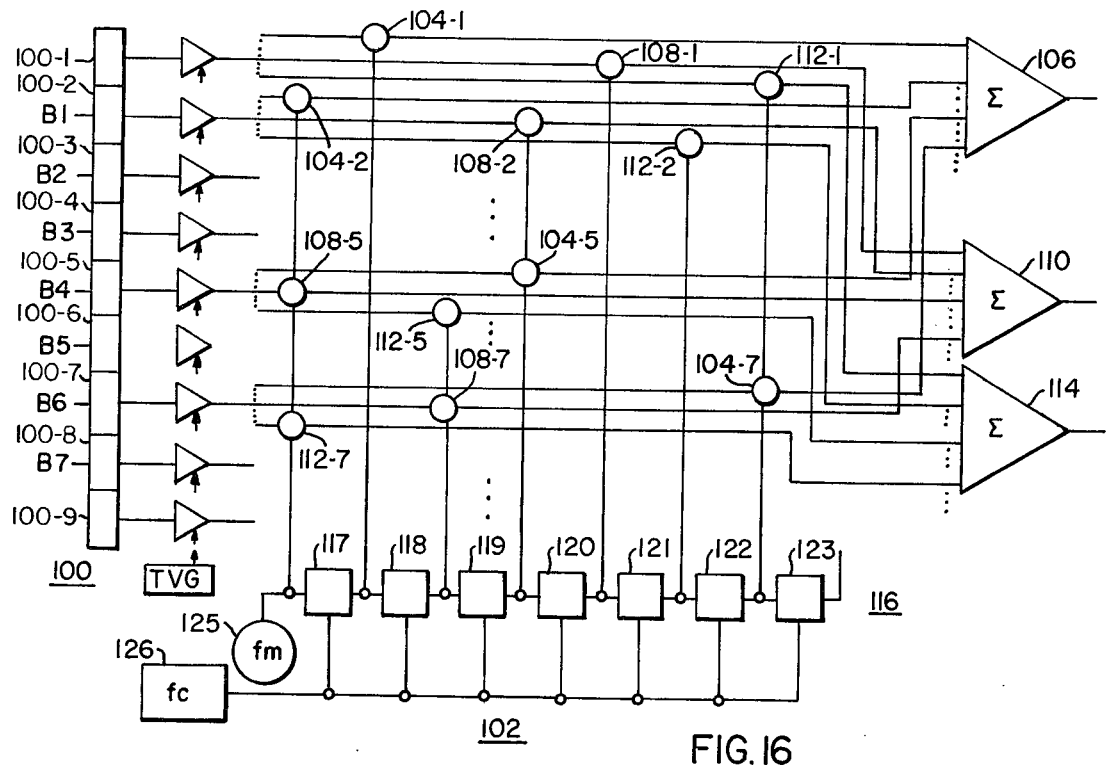
FIG. 16 is a preferred embodiment of apparatus for forming multiple beams.

A circuit for forming multiple beams utilizing the principles discussed with respect to FIG. 8, is illustrated in FIG. 16 where for purposes of illustration the apparatus forms seven beams designated B1 to B7. The transducer 100 is comprised of nine transducer segments, 100-1 to 100-9, each segment providing an output signal of a certain amplitude and phase as a result of acoustic energy from the insonified area. In this respect the transmitter transducer (not shown) will be designed to insonify an area at least equal to the area looked at by all these receiver beams.

Since seven different beams are being formed by the apparatus of FIG. 16, the output of each transducer segment, after suitable preamplification, is provided in parallel, to seven different mixers which receive the mixing signal from signal generator 102. However, for clarity, only three such parallel lines are illustrated and only from transducer segments 100-1, 100-2, 100-5 and 100-7.

For forming beam B1 there is provided a plurality of mixers of which 104-1, 104-2, 104-5 and 104-7 are illustrated. The outputs of these mixers, as well as the other mixers, not shown, for forming beam B1 are of the form illustrated in FIG. 7 and are collectively provided to adder 106, the output of which may be processed as previously described in order to display information received by beam B1.

Beam B4 centered on transducer segment 100-5 is formed by the output of the segments being provided to a plurality of mixers of which four, 108-1, 108-2, 108-5 and 108-7 are shown. The outputs from all of these mixers associated with the beam B4 are provided to adder 110, the output signal of which is processed to display information received by beam B4. In a similar fashion, for beam B6 mixers 112-1 and subsequent 112 mixers receive the output signals from the transducer segments which signals when combined with the mixing signal from signal generator 102 yield a plurality of outputs which are provided to adder 114 for further processing and display.

The signal generator 102 may be similar to that illustrated in FIG. 8 in the inclusion of a digital shift register 116 having a plurality of stages 117 to 123. The mixing signal $f_m$ is provided by oscillator 125 and the clock signal $f_c$ is provided by the control frequency generator 126.

In examining just the first line from each transducer segment, that is the lines containing the 104 series of mixers, it is seen that the general arrangement is the same as that of FIG. 8 except that the beam is centered on segment 100-2. The same is true for the arrangement containing the 108 series of mixers with beam B4 centered on segment 100-5 as well as the 112 series of mixers with beam B6 centered on segment 100-7. Basically, the lines containing the mixers and the adder of FIG. 8 are duplicated seven times in the arrangement of FIG. 16 however with the left most mixer being centered, or opposite, different transducer segments. For example mixers 104-2, 108-5 and 112-7 opposite respective beams B1, B4 and B6 receive the reference waveform $f_m$ from oscillator 125. Subsequent mixers receive the $f_m$ waveform shifted in phase from the outputs of stages 117 to 123 of the digital shift register 116, all under control of the clock frequency $f_c$ which varies linearly with time, as previously explained.

The mixers therefore receive the output signals from the transducer segments and the signal generator and provide a plurality of sets of signals with substantially no phase difference between signals of a set and each set of signals represents a particular beam. The sets of signals are further processed by the adder, filters, and detectors in order to obtain a plurality of display signals.

YAWING CORRECTION

Figure 17:
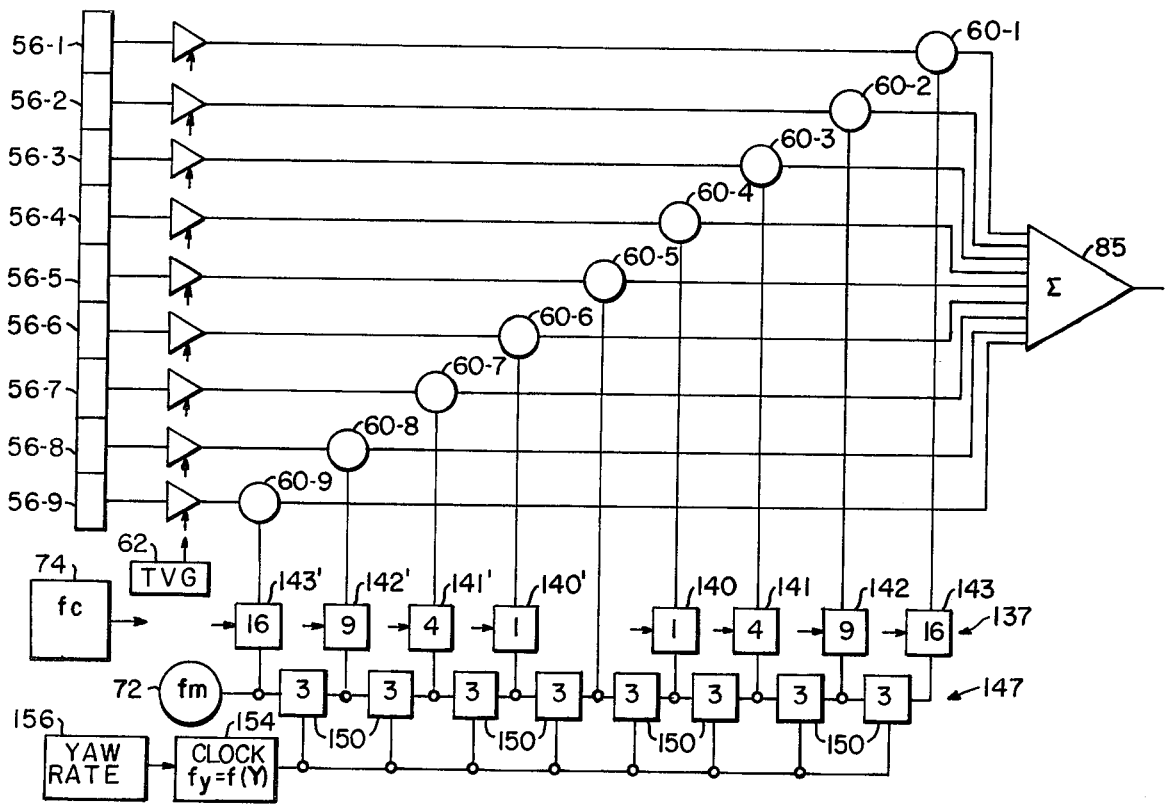
FIG. 17 illustrates another embodiment of the invention for yaw compensation.

In calm waters the carrier vehicle is able to proceed along a straight line course. In actuality however, and depending on the size of the carrier vehicle, it is influenced by water motion such that the vehicle may experience horizontal angular rotation about a vertical axis, this motion being known as yaw. If the vehicle is yawing at a certain yaw rate, and during this motion an acoustic transmission takes place it is possible that, due to the yawing, the receive beam or beams will not be pointed at the area that the transmit beam insonified. Accordingly means may be provided to, in effect, steer the receiver beam or beams to compensate for the yawing. One such arrangement is illustrated in FIG. 17 for a single beam however the principles are applicable to the multi-beam situation. Components of FIG. 17 have similar counter-parts in the arrangement of FIG. 8, and accordingly have been given the same reference numerals. Whereas in FIG. 8 the mixers 60-1 to 60-9 were arranged in a form of an arrow head pointing to the transducer segment on which the beam was centered, the arrangement of FIG. 17 has the same mixers arranged along a straight line, however each is connected to receive the respective output signals of the transducer segments 56-1 to 56-9 as in FIG. 8.

In order to variably focus the transducer with time, there is included the oscillator 72 for providing the mixing signal $f_m$, and the control frequency generator 74 for providing the variable clocking frequency $f_c$. A digital shift register 137 is provided however in somewhat different form from that described in FIG. 8. The digital shift register includes a plurality of stages 140 to 143 and their identical counter-parts 140' to 143' each containing the number of units of delay as indicated inside the blocks.

Means are provided to automatically steer the receiver beam so as to be always pointed at the insonified area in the presence of yawing. In order to accomplish this there is included a digital shift register 147 having a plurality of identical stages 150 each presenting the same amount of delay, as indicated inside the blocks, to the mixing signal $f_m$. The stages 150 receive clocking pulses at a frequency $f_y$ from the clock 154, with $f_y$ being dependent upon the yaw rate. A yaw rate sensor 156 is provided for sensing the yaw rate to in turn, govern the clock frequency.

Except as provided to mixers 60-9 and 60-5, the mixing signal $f_m$ is delayed twice on its way to each mixer, once for beam steering and once for all range focusing. Either delay can come first, however FIG. 17 illustrates the shift register 147 for beam steering as being the first delay since with that arrangement all of the stages 150 can be identical.

Neglecting for the moment the presence of stages 150 of beam steering circuit, the mixing signal $f_m$ is applied to the stages of the digital shift register 137. In the apparatus of FIG. 8, the mixer 60-5 directly receives the output from the oscillator 72 as the reference waveform, that is without any phase shift. The same is true of mixer 60-5 in FIG. 17. Mixers 60-4 and 60-6 of FIG. 8 receive the mixing signal after one unit of delay by stage 67. Accordingly stages 140 and 140' of FIG. 17 provide one unit of delay to mixers 60-4 and 60-6. The total units of delay to mixers 60-3 and 60-7 is that provided by stages 67 and 68. The cumulative delay as seen in FIG. 9 is four units and accordingly stages 141 and 141' provide four units of delay to mixers 60-3 and 60-7. The total units of delay go up by the square of the stage such that the third stage 142 and 142' provide nine units of delay and the fourth stage 143 and 143' provide 16 units of delay so that, in the absence of the steering arrangement, the apparatus operates exactly as described with respect to FIG. 8.

One way of accomplishing yaw compensation is to physically mount the receiver transducer at some angle $\theta$ relative to the direction of travel, as indicated in FIG. 18 wherein the direction of travel is the Y axis and wherein the transducer is positioned relative to the direction of travel by angle $\theta$ where $\theta$ may be for example one half the maximum expected yaw angle. In the absence of yaw, and assuming that the transmitter transducer is skewed to transmit slightly forward of lateral, the correct position for the transducer should be as indicated at 56' for receiving energy from the insonified area. For this situation the clock 154 can provide a nominally correct frequency $f_{yn}$ simultaneously to all of the stages 150. The shifts or delays presented by these stages have the effect of steering the formed beam by an amount proportional to the frequency $f_y$. No steering delay is provided to mixer 60-9 and accordingly transducer segments 56-9 would effectively remain stationary while maximum delay is provided after the last stage to mixer 60-1. The orientation of the transducer of FIG. 17 relative to that in FIG. 18 would be such that transducer segment 56-9 would be positioned at pivot point 160.

Should the vehicle start yawing at a certain rate, the danger exists that the receiver beam will not be looking at the insonified area because of this motion. Accordingly the yaw rate is sensed and the clock frequency is modified from its nominal frequency $f_{yn}$ to steer the beam to where the insonified area is. By decreasing the frequency from its nominal position the beam is steered toward the dotted line position 56'' and an increase in frequency will steer it toward the physical position 56. The stages 150 operate to delay or phase shift the mixing frequency $f_m$ by gradually increasing amounts as it is applied to the outputs of the transducer segments. The amount of beam steering is governed by the frequency of clock 154 which in turn is a function of the yaw rate of the vehicle.

PORT AND STARBOARD COVERAGE

The search rate can be doubled by providing transducers on both the port and starboard sides of the carrier vehicle and operable at different frequencies. The signal processing apparatus of the present invention can be utilized for both port and starboard arrangements and FIG. 19 duplicates the apparatus of FIG. 8 and additionally includes a second transducer 56' for use on the opposite side of the vehicle. In addition to unwanted side bands and harmonics, the output of each mixer will contain not only the desired signal of $f_s-f_m$ from transducer 56, but will also include an $f'_s-f_m$ signal from transducer 56'. In order to extract this latter signal from the output of summer 85, an additional band pass filter 87' is provided and detector 89' receives its output to in turn provide the signal for display.

SHADING

In the operation of sonars utilizing a plurality of transducers or transducer segments making up a transducer, use is made of a technique known as shading to vary the response of the elements primarily to reduce unwanted side lobes of the transmit or receive beam. In the appratus described herein the arcs shown in FIG. 5A are approximated in steps corresponding to the length of the transducer segment. This approximation may cause side lobes known as grating side lobes which may be undesirable at short ranges. In order to reduce these side lobes the transducer illustrated may be broken into smaller segments, segments may be taken out of the circuit for close ranges, or the various outputs of the transducer segments may be properly shaded as a function of time.

I claim:
1. Side-looking sonar apparatus comprising:
   a. a receiver transducer having a plurality of transducer segments lying along a line and each operable to provide an output signal in response to receipt of acoustic energy from a target area insonified by repetitive acoustic transmissions;
   b. circuit means for forming multiple adjacent parallel receiver beams each said beam being centered on a respective one of said transducer segments;
   c. signal processing means for focusing said receiver beams at a predetermined initial range and continuously electronically varying said focus after each said transmission.
2. Side-looking sonar apparatus comprising:
   a. an elongated transducer for receipt of acoustic energy from a target area insonified by repetitive acoustic transmissions;
   b. said transducer having a plurality of segments each operable to provide a respective output signal in response to said acoustic energy;
   c. means for processing said signals to simulate a plurality of curved transducers each having a radius R which continually increases as a function of time after a transmission.
3. Apparatus according to claim 2 wherein:
   a. said segments lie along a straight line.
4. Side-looking sonar apparatus comprising:
   a. a receiver transducer having a plurality of transducer segments each operable to provide an output signal in response to receipt of acoustic energy from a target area insonified by repetitive acoustic transmissions;

b. means for processing said output signals including:
  i. means for modifying the phase of all of said output signals as a function of time;
  ii. means for combining different combinations of said modified signals for forming multiple receiver beams; and
  iii. means for detecting information content of, and displaying said processed signals.

5. Side-looking sonar apparatus comprising:
a. a receiver transducer having a plurality of transducer segments, including a reference segment, and each operable to provide an output signal in response to receipt of acoustic energy from a target area insonified by repetitive acoustic transmissions;
b. a plurality of signal combining means each for receiving a respective one of said output signals; and
c. circuit means operable to supply to each said signal combining means, a signal having a certain amplitude and phase, the magnitude of said phase being a function of the particular segment's distance from said reference segment, and to vary said magnitude as a function of time.

6. Apparatus according to claim 5 which includes:
a. a plurality of reference segments;
b. a plurality of signal combining means for receiving the output signal from each said transducer segment;
c. the magnitude of the phase of the signal supplied by said circuit means being a function of a particular segment's distance from one of said reference segments.

7. Side-looking sonar apparatus comprising:
a. a receiver transducer having a plurality of transducer segments each operable to provide an output signal in response to receipt of acoustic energy from a target area insonified by repetitive acoustic transmission;
b. signal generating means operable to provide a plurality of output signals each of a certain amplitude and phase;
c. signal combining circuits for receiving said output signals from said transducer segments and signal generating means for providing a plurality of signals with substantially no phase difference between them;
d. means for further processing said plurality of signal provided by said signal combining circuits for producing a signal for display;
e. said signal generating means including means for varying the relative phases of its output signals as a function of time.

8. Apparatus according to claim 7 which includes:
a. a carrier for said apparatus and;
b. means to vary the relative phases of said output signals of said signal generating means as a function of the yaw rate of said carrier.

9. Apparatus according to claim 7 wherein:
a. said signal combining circuits are mixers and;
b. said signal generating means includes;
  i. a source of mixing signal of a frequency $f_m$,
  ii. a digital shift register having a plurality of tapped stages the output signals of which are provided to said mixers, and
  iii. a source of control signal of a frequency $f_c$ operable to clock the stages of said shift register to transmit the mixing signal down the shift register;
c. said frequency $f_c$ being variable as a function of time.

10. Apparatus according to claim 9 wherein:
a. said frequency $f_c$ linearly varies from an initial value to a final value after each said acoustic transmission.

11. Apparatus according to claim 7 wherein:
a. said means for further processing includes:
  i. an adder for summing the outputs of said signal combining circuits;
  ii. a filter for receiving the output of said adder to filter out unwanted frequency components thereof; and
  iii. detector means responsive to the signal passed by said filter for obtaining a display signal.

12. Side-looking sonar apparatus comprising:
a. a receiving transducer having a plurality of transducer segments each operable to provide an output signal in response to receipt of acoustic energy from a target area insonified by repetitive acoustic transmissions;
b. signal generating means operable to provide a plurality of output signals each of a certain amplitude and phase;
c. signal combining circuits for receiving said output signals from said transducer segments and signal generating means for providing a plurality of sets of signals with substantially no phase difference between signals of a set;
d. means for further processing said plurality of sets of signals provided by said signal combining circuits for providing a plurality of signals for display;
e. said signal generating means including means for varying the relative phases of its output signals as a function of time.

* * * * *